United States Patent [19]

Collins

[11] Patent Number: 5,671,355
[45] Date of Patent: Sep. 23, 1997

[54] RECONFIGURABLE NETWORK INTERFACE APPARATUS AND METHOD

[75] Inventor: Mark Andrew Collins, Austin, Tex.

[73] Assignee: PredaComm, Inc., Austin, Tex.

[21] Appl. No.: 713,755

[22] Filed: Sep. 13, 1996

Related U.S. Application Data

[63] Continuation-in-part of Ser. No. 265,498, Jun. 23, 1994, abandoned, which is a continuation-in-part of Ser. No. 905,285, Jun. 26, 1992, abandoned.

[51] Int. Cl.$^6$ ........................................... G06F 13/00
[52] U.S. Cl. ................... 395/200.2; 395/500; 395/306; 395/309; 395/828; 395/884
[58] Field of Search ................... 395/500, 200.02, 395/200.13, 200.2, 680, 681, 285, 306, 309, 828, 831, 834, 835, 882, 884

[56] References Cited

U.S. PATENT DOCUMENTS

| | | | |
|---|---|---|---|
| 4,032,893 | 6/1977 | Moran | 340/825.83 |
| 4,513,373 | 4/1985 | Sheets | 395/200.18 |
| 4,532,588 | 7/1985 | Foster | 395/200.17 |
| 4,641,261 | 2/1987 | Dwyer et al. | 395/883 |
| 4,648,061 | 3/1987 | Foster | 395/200.1 |
| 4,677,588 | 6/1987 | Benjamin et al. | 295/200.02 |
| 4,688,170 | 8/1987 | Waite et al. | 395/500 |
| 4,706,081 | 11/1987 | Hart et al. | 340/825.03 |
| 4,725,249 | 2/1988 | Blackwood et al. | 439/535 |
| 4,750,114 | 6/1988 | Hirtle | 395/250 |
| 4,807,282 | 2/1989 | Kazan et al. | 379/284 |
| 4,831,620 | 5/1989 | Conway et al. | 370/401 |
| 4,876,742 | 10/1989 | Vacon et al. | 455/66 |
| 4,954,949 | 9/1990 | Rubin | 395/200.01 |
| 4,969,083 | 11/1990 | Gates | 364/147 |
| 4,972,470 | 11/1990 | Farago | 380/3 |
| 5,043,884 | 8/1991 | Kuhlmann et al. | 379/93 |
| 5,239,662 | 8/1993 | Danielson et al. | 395/800 |
| 5,264,958 | 11/1993 | Johnson | 395/309 |
| 5,289,580 | 2/1994 | Latif et al. | 395/883 |
| 5,307,463 | 4/1994 | Hyatt et al. | 395/821 |
| 5,428,526 | 6/1995 | Flood et al. | 364/141 |
| 5,440,755 | 8/1995 | Harwer et al. | 395/800 |

FOREIGN PATENT DOCUMENTS

| | | | |
|---|---|---|---|
| 89311063 | 10/1989 | European Pat. Off. | 13/40 |

*Primary Examiner*—William M. Treat
*Assistant Examiner*—Viet Vu
*Attorney, Agent, or Firm*—Russell D. Culbertson; Shaffer & Culbertson

[57] ABSTRACT

A reconfigurable computer network interface device (10) includes a reconfigurable controller (12), reconfigurable bus interface (22), and reconfigurable transceiver (14). The device (10) also includes a configuration control arrangement (20) and on-board memory (16) for storing configuration instructions. The preferred form of the invention also includes an arrangement for receiving configuration instructions from an external source. The reconfigurable bus interface (22) may be configured by hardware set-up and operational software instructions to emulate a bus interface for any of a number of different computer bus architectures. A bus adapter (26) connects between a bus port (39) associated with the reconfigurable bus interface (22) and the computer bus to provide the physical connection between the device (10) and the host computer. The reconfigurable transceiver (14) is reconfigurable by hardware set-up and operational software instructions to communicate in any one of a number of different network hardware protocols. A media connector (24a, 24b) cooperates with a transceiver port (23a, 23b) associated with the reconfigurable transceiver (14) to provide the physical connection between the device (10) and network medium (32a, 32b). The reconfigurable controller (12) is configurable by hardware set-up and operational software instructions to communicate in any of a number of different software protocols. Thus, the reconfigurable computer network interface device (10) may operate as a network card, bridge, router, brouter, or gateway between substantially any type of computer and any type of computer network.

16 Claims, 3 Drawing Sheets

RECONFIGURABLE NETWORK INTERFACE APPARATUS AND METHOD

BACKGROUND OF THE INVENTION

This application is a Continuation-in-Part of application Ser. No. 08/265,498, filed Jun. 23, 1994, now abandoned which was a Continuation-in-Part of application Ser. No. 07/905,285, filed Jun. 26, 1992, now abandoned.

This invention relates to a network interface device which may be reconfigured to operate with any of a plurality of network types and with any of a plurality of different computer bus types. The invention also encompasses a method for reconfiguring an interface between a computer and a computer network.

Personal computers were originally developed to support a single-user work station environment. To further enhance productivity, hardware and software was developed to connect individual computers together in a single work space to form a local area network or LAN. In a LAN, users could share files and applications actually stored on another PC in the network, and could also use printers or other peripheral devices actually connected to other PCs in the network.

The Open Systems Interconnection ("OSI") standards were created to help provide some uniformity among the many vendors providing network products. The OSI model consists of seven layers of specifications which describe how data is to be handled at different stages of its transmission. These layers comprise the application, presentation, session, transport, network, data link, and physical layers. Within these OSI standards, many different network types have been developed to provide the desired network connections and data transfer. Major network interface protocols include ARCNet developed by Data Point, Ethernet (used by DEC, Intel, and Xerox), Token Ring (IBM), and FDDI (the ANSI protocol). Each network type is sufficiently different to create an industry around each communication strategy. Also, each network type uses a different strategy or arrangement to coordinate network communications and functions. For example, ARCNet networks use hubs to coordinate network activity whereas EtherNet and Token Ring networks use concentrators and MAU's, respectively.

Problems arose when it was desired that a computer on one network communicate with a computer on another network. Different networks may have different topologies and utilize different network protocols grouped according to their support for the OSI model. The "network topology" is the manner in which network elements are physically connected together in the network. Network topologies include tree, bus, ring, and star topologies. Hardware protocols include ARCNet, Ethernet, Token Ring, and FDDI, and may encompass several layers of the OSI model. The term "hardware protocol" refers generally to the data validation scheme, data transfer speed, communication arbitration, and intermediate storage or buffer control employed by a particular network. Software protocols are the ways in which packets of data are framed within a particular hardware protocol. For example, Ethernet software protocols include Ethernet_II, Ethernet_802.3, Ethernet_802.2, and Ethernet_SNAP.

Various types of network interface devices were developed to provide the desired inter-network communications. Bridges are network interface devices which can connect similar or dissimilar LANs, and in terms of the OSI model, connect at the media access control sublayer of the data link layer. Routers were developed to connect LANs having common protocols at the network layer of the OSI model and above. Routers are protocol sensitive and, for example, can connect two TCP/IP or DECNet based networks but cannot connect a TCP/IP based network to a DECNet based network. Brouters combine the functions of bridges and routers to provide near bridging performance and the intelligence of a router. Finally, at the highest level, network interface devices known as "gateways" were developed to perform protocol conversion at all seven layers of the OSI model. A gateway can interconnect two LANs having completely different architectures and protocols. The word "gateway" is also used in computer network terminology as a generic term for repeaters (hubs, concentrators, MAUs, etc.), bridges, routers, and brouters.

Bridges, routers, brouters, and gateways were all specifically designed to operate between certain types of networks. For example, a prior art bridge might be designed to operate between Ethernet and Token Ring hardware protocols. The device could not provide the desired bridge functions between Ethernet and a non-Token Ring network, such as an ARCNet network for example.

Furthermore, it is impossible for a user to pull a prior art "ARCNet" network interface card, for example, and place it in a different network system such as an "Ethernet" system. Because of the different configuration associated with the protocol controllers and the transceivers required for each network type, the user had to use an interface card specifically designed for the particular network type or topology. If the user desired to change and use a different network type at a later date, the entire network system had to be replaced with a new network system. This change of network types generally required a new interface card for each computer in the network and often times required a different type of media for transferring data between computers.

Different network media and computer bus architectures posed additional problems for prior art network interface devices. Prior network interface cards were specific to one or two media types and were unable to accept a variety of different media types. Thus, if the medium which connects the various computers in the network was changed, the interface cards for each computer also had to be changed. Likewise, the prior art network interface cards were adapted to connect only to a single computer bus type. Each machine or PC in the network required a card having a bus connection adapted specifically for the particular bus structure utilized by that computer. A prior art network interface card could not be used in one machine having one type of bus structure and then later used in a different machine having a different bus structure.

Thus, there is a need in the art for a network interface card that can communicate in ARCNet, Ethernet, Token Ring, and other network hardware protocols as well. Also, there is a need for a network interface card that may be reconfigured easily to accept different network media types and to provide hub, bridge, router, brouter, and gateway capabilities.

SUMMARY OF THE INVENTION

It is an object of the invention to overcome the above-described problems and others associated with network interface devices. More particularly, it is an object of the invention to provide a network interface apparatus that is reconfigurable to accept different media types, bus structures, and network communication types. Another object of the invention is to provide a method for reconfiguring a network interface device to accept any of several media types, computer bus structures, and network hardware and software protocols.

To accomplish these objects, the apparatus according to the invention includes a reconfigurable controller, a reconfigurable transceiver, and a reconfigurable bus interface, together preferably with memory for storing configuration information and operational information for several different network types and bus types. The reconfigurable controller controls and manages data transmitted to and from the network interface device over the computer bus to which the device is connected, and also controls and manages the transfer of data to and from the network media to which the device is connected. The reconfigurable transceiver emulates the desired hardware protocol in transmitting and receiving data across the network media. Communication with the computer to which the interface device is connected is facilitated through the reconfigurable bus interface.

The reconfigurable network interface device according to the invention utilizes interchangeable adapters for making the physical connection to both the computer bus and to the network medium. A transceiver port is included in the reconfigurable transceiver and is adapted to be connected to a media adapter which includes a media connector for connecting to the medium desired for the network communications. The media adapter may be changed to facilitate connecting the device to different types of network media such as coaxial or twisted pair cable, for example. A bus port is associated with the reconfigurable bus interface and may be connected to a bus adapter having a bus port connector. The bus adapter also includes a bus socket connector and may be changed easily to facilitate connecting the card to different bus structures or architectures such as an ISA bus or a PCI bus, for example.

The reconfigurable controller, transceiver, and bus interface each include an array of circuits, such as a field programmable gate array, which can be configured by software instruction to provide a desired functionality. A configuration input is associated with the reconfigurable controller, reconfigurable transceiver, and reconfigurable bus interface and receives configuration instructions to configure the particular device. In the preferred form of the invention, configuration instructions for the reconfigurable controller, transceiver, and bus interface may be directed to their respective configuration input either through a device bus or through a separate external configuration bus. The reconfigurable controller, transceiver, and bus interface respond to the configuration instructions to emulate the functionality of the respective element just as if the device were hardwired. For example, the reconfigurable bus interface is configured into a series of buffers and latches for transmitting and receiving data to and from the host computer bus. The reconfigurable transceiver is configured to emulate the hardware protocol of the network, or networks to which the device is connected. The reconfigurable controller responds to configuration instructions to produce a circuit which emulates the controller function associated with a particular network software protocol. For example, when the reconfigurable network device according to the invention is configured as an Ethernet card, the controller is configured to transfer data at a valid Ethernet data transfer rate, to control intermediate storage between the host bus and the transceiver, and to perform data validation and communication arbitration, all according to an Ethernet network communication scheme.

The configuration instructions for the reconfigurable controller, reconfigurable transceiver, and reconfigurable bus interface include hardware set-up instructions which cause the circuit array to emulate a certain circuit, and also operational software instructions for controlling how the circuit operates. Thus, part of the hardware instructions may include instructions to set up a memory element within the circuit array and then operational software instructions may be stored in the memory element and used to direct the operation of the hardware configured in the circuit array.

In the preferred form of the invention, the reconfigurable controller, reconfigurable transceiver, and reconfigurable bus interface are each implemented in a field programmable gate array. Alternatively, neural network circuits could be used to emulate the desired functionality. As used herein, "circuit array" includes any array of circuits which can be configured by software instruction to emulate the functionality of a particular circuit and particularly, different controller, transceiver, and bus interface circuits.

In one form of the invention, all of the configuration instructions may be loaded into the reconfigurable interface device from memory external to the device through a suitable serial port or by picking up a serial transmission from one conductor of the computer bus. An on-board configuration controller controls how these externally derived configuration instructions are applied to the reconfigurable transceiver, controller, and bus interface. The preferred form of the invention, however, also includes non-volatile configuration memory and configuration control means which includes means for determining a network type and bus type. The configuration memory stores configuration instructions including hardware set-up information and operational software information for various types of transceivers, controllers, and bus interfaces. Network type and bus type determining means within the configuration control means passively monitors signals at the transceiver port and bus port, respectively, and then compares these signals with signature signals stored in memory to identify the particular network type and bus type. Once the network type and bus type is identified, the configuration control means directs the appropriate hardware set-up and operational software instructions from memory to the reconfigurable transceiver, reconfigurable controller, and reconfigurable bus interface. Where the bus type or network type cannot be matched with a type stored in memory on the device, the external configuration input may be used to load configuration information into the reconfigurable controller, reconfigurable transceiver, and reconfigurable bus interface.

In one form of the invention, the reconfigurable interface device is adapted for communicating with more than one network. In this alternate form of the invention, the device includes two or more transceiver ports. The reconfigurable transceiver circuit in this form of the invention may be configured by software instruction received at the configuration input to emulate two different hardware protocols which may be required by the two networks to which the device is connected.

The interface device according to the invention has the advantage of being adaptable to operate with a number of different types of computer bus structures and a number of different network types, including different media types. For example, the interface device according to the invention may be used in an EtherNet type network using a coaxial cable network medium and then removed and installed in a work station having a different bus structure and operating in a different network such as a Token Ring type network, using a different network communication medium. The reconfigurable interface device according to the invention may recognize the bus type by the signals received at the bus port and then load hardware and software instructions from on-board memory or an external source into the reconfigurable bus interface to emulate a bus interface adapted specifically for communicating with that particular bus architecture. Also, the network type determining means associated with the interface device may identify the network type by the signals received at the transceiver port, and then direct hardware and software instructions to the reconfigurable transceiver and reconfigurable controller to operate in the desired network hardware protocol and software protocol. The interface device may even accommodate future network protocols and future bus architectures assuming the circuit arrays employed as the reconfigurable elements have sufficient capacity to emulate such future network protocols and bus architectures. Furthermore the reconfigurable controller associated with the reconfigurable interface device may be configured so that the device functions as a bridge, router, brouter, or gateway for internetwork communications.

These and other objects, advantages, and features of the invention will be apparent from the following description of the preferred embodiments, considered along with the accompanying drawings.

DESCRIPTION OF THE PREFERRED EMBODIMENTS

Figure 1:
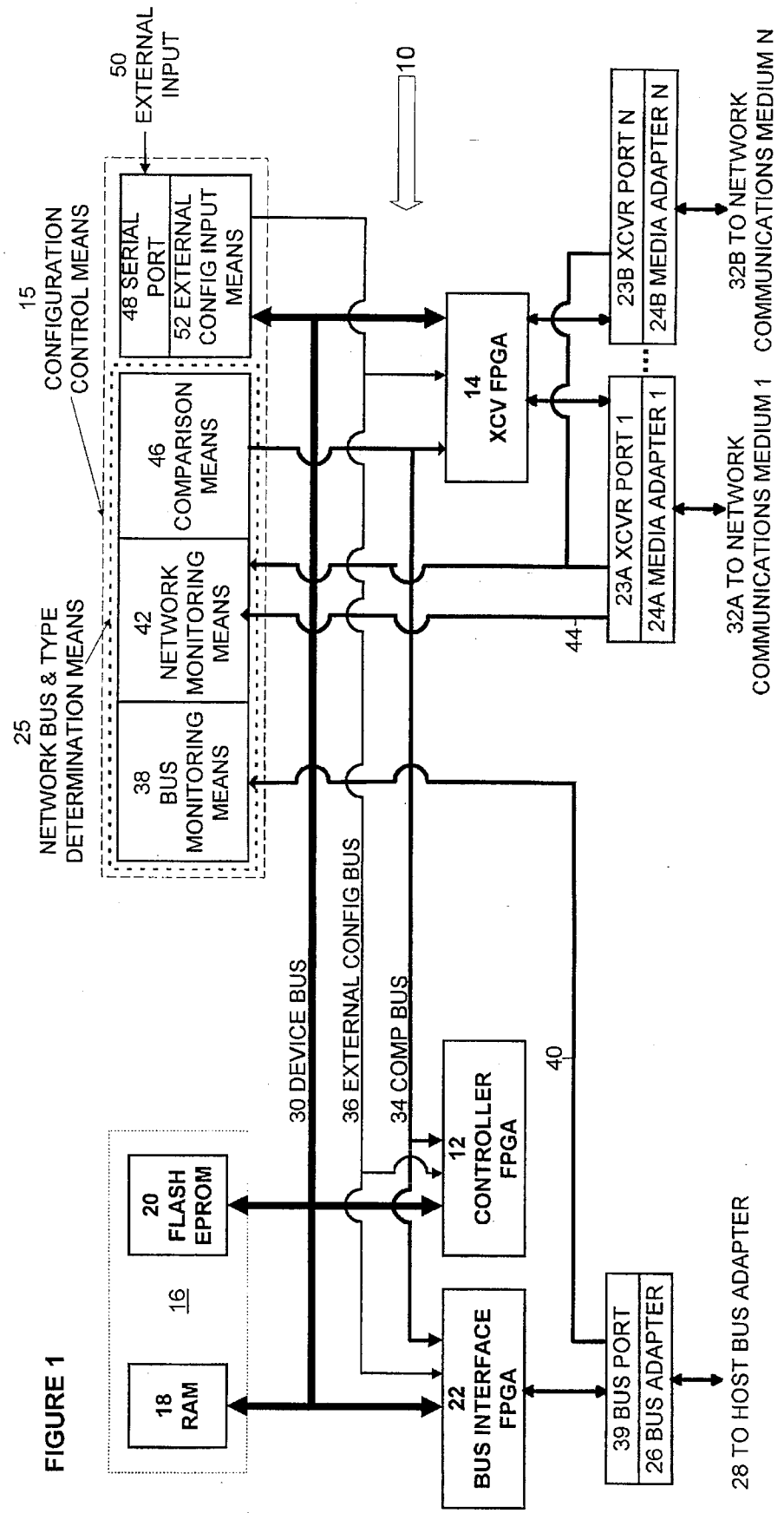
FIG. 1 is a schematic diagram showing one preferred form of the reconfigurable network interface embodying the principles of the invention.

As illustrated in FIG. 1, the interface device 10 according to the invention includes a reconfigurable controller 12, reconfigurable transceiver 14, and a reconfigurable bus interface 22. Also, the device 10 includes on-board memory 16 preferably comprising RAM 18 and EPROM 20. Configuration control means 15 included in device 10 preferably comprises network and bus type determination means 25 and an external serial port 48 and external configuration input means 52.

The volatile memory device 18, non-volatile memory 20, reconfigurable bus interface 22, reconfigurable controller 12, and reconfigurable transceiver 14 as well as the configuration control means 15 are all connected to a device bus 30 for transferring data between elements. The configuration control means 15 uses configuration address bus 34 to address the particular reconfigurable element, either reconfigurable bus interface 22, reconfigurable controller 12, or reconfigurable transceiver 14.

The reconfigurable bus interface 22 is a associated with a bus port 39 and the reconfigurable transceiver 14 is associated with at least one transceiver port 23a. In the illustrated form of the invention, the reconfigurable transceiver 14 is associated with one other transceiver port 23b. The number of transceiver ports associated with the transceiver 14 is limited only by the number of transceiver configurations the reconfigurable transceiver may emulate at a given time as will be discussed below.

In the preferred form of the invention, the reconfigurable interface device 10 is implemented as a card of the type which may be connected to an expansion slot of a personal computer. A bus adapter 26 is required to make the physical connection between the bus port 39 and the PC expansion slot. Thus the bus adapter includes a bus socket connector specific to the particular PC expansion slot and a standardized bus port connector to connect to the bus port 39. Different bus adapters are provided to accommodate the different expansion bus slots.

In other forms of the invention, the entire reconfigurable interface device 10 may be implemented as a PCMCIA card. The PCMCIA card form of the invention may connect to a host computer either through a PCMCIA bus associated with the host computer or through a PCMCIA adapter connected to the host computer expansion bus. In these forms of the invention, the bus port 39 comprises the standard PCMCIA connecter associated with the PCMCIA card and the bus adapter 26 comprises the PCMCIA bus and the PCMCIA adapter card, respectively.

Also, a media adapter such as adapter 24a is required for each network medium to which the interface card is to be connected. Each media adapter 24a and 24b includes a standardized transceiver port connector for connecting to a transceiver port 23a, 23b. Each media adapter 24a and 24b also includes a media connector specific to the particular network communication medium 32a, 32b. Different media adapters are provided to accommodate the different types of media used for network communications.

To change the interface device 10 from one application to the next, the user need only change the bus adapter 26 and media adapter 24a, 24b. The bus adapter 26 is chosen to fit the particular expansion slot or other bus connection of the PC in which the device is to be used. The media adapters 24a, 24b are chosen to fit the particular network media such as coaxial cable, or twisted pair cable, for example, to which the interface device 10 is to be connected. Where network communications are wireless, the media adapter 24a, 24b includes hardware for transmitting and receiving the required wireless communication signals.

Each reconfigurable element, reconfigurable controller 12, reconfigurable transceiver 14, and reconfigurable bus interface 22 includes a configuration input and an array of circuits which may be configured by instructions received at the configuration input to emulate a particular type of circuit. In the preferred form of the invention, the configuration input associated with each reconfigurable element is connected to an external configuration bus 36 and a portion of the device bus 30.

Preferably the reconfigurable controller 12, reconfigurable transceiver 14, and reconfigurable bus interface 22 each comprise a field programmable gate array such as a XILINX 4096 field programmable gate array, for example. As known in the art, field programmable gate arrays comprise and array of gate circuits which can be configured to emulate different circuit types. For example, a field programmable gate array may be configured to function as a series of buffers or latches for receiving and holding data for additional processing. Also, a field programmable gate array can be configured to operate as a processor and include both random access and non-volatile memory. Field programmable gate arrays also include a number of input and output pins which can be configured to receive or send dam, and certain dedicated pins for power and ground as well as for configuration input. In the preferred form of the invention, the external configuration bus 36 is connected to one input of the array dedicated for receiving configuration instructions. Also, a portion of the device bus 30 is connected to one or more inputs dedicated for receiving configuration input instructions for the field programmable gate array. In this preferred form of the invention, the configuration input for the device comprises the external configuration bus and a portion of the device bus 30. Additionally, a field programmable gate array may be configured so that information received on non-dedicated input pins is used to further configure the device. In such cases, the non-dedicated input locations also comprise the configuration input of the device.

In other preferred forms of the invention the reconfigurable controller 12, reconfigurable transceiver 14, and reconfigurable bus interface 22 may comprise other types of devices such as neural network circuits which can also operate to emulate a variety of different circuit functions. The reconfigurable elements of the invention, reconfigurable controller 12, reconfigurable transceiver 14, and reconfigurable bus interface 22 may include any device having an array of circuits and configuration input means for configuring the array to emulate different circuit functionality, and particularly the host bus interface functions, network controller functions, and transceiver functions required of a network interface device. Also, although the reconfigurable elements are illustrated in FIG. 1 as discrete devices, field programmable gate arrays, for example, may be large enough to accommodate the functions of two or perhaps all three of the reconfigurable elements 12, 14 and 22 shown in FIG. 1. This arrangement where a single device includes all functions of one element and all or a portion of the functions of another reconfigurable element 12, 14, and 22 is to be considered an equivalent of the illustrated arrangement of discrete devices.

Referring still to FIG. 1, configuration control means 15 provides the required configuration signals across the device bus 30 or external configuration bus 36 to configure the reconfigurable devices 12, 14, and 22. Configuration address bus 34 is used to address the desired device 12, 14, or 22 to receive the appropriate configuration signals. The preferred configuration control means 15 includes network and bus type determination means 25 which includes bus monitoring means 38, network monitoring means 42, and configuration controller 46. The bus monitoring means 38 passively monitors signals at the bus port 39 through connection 40 while the network monitoring means 42 passively monitors signals at the transceiver port 23a and any additional transceiver port such as 23b across a connections 44 for each port. The configuration controller 46, compares the signals at the bus port to characteristic or signature signals of different bus types to identify the particular bus type. Also, the configuration controller 46 compares signals monitored at the transceiver ports 23a, 23b to characteristic or signature signals of different network types to determine the network type. Once the bus type and network type are identified, the configuration controller 46 directs configuration instructions preferably stored in EPROM 20 to the particular reconfigurable device 12, 14, or 22 addressing each through the configuration address bus 34. The network and bus type determination means 25 may be implemented with a neural net processor such as an Intel NI1000 Recognition Accelerator or Bell Labs NET32K processor or any other device which provides the required monitoring, comparison, and controller functions.

In the preferred form of the invention, when the configuration controller 46 cannot match signals at the bus port 39 or transceiver ports 23a, 23b with stored bus types or network types, respectively, configuration information may be loaded from the external input 50 through serial port 48. The external configuration input means 52 associated with the serial port 48, transfers configuration information to the desired device across the external configuration bus 36 to configure the particular device, reconfigurable controller 12, reconfigurable transceiver 14, or reconfigurable bus interface 22. Those skilled in the art will readily appreciate that although the external input is shown as a separate serial connection, a serial input may be applied to one of the pins of the computer bus to which the device is connected and appear as a signal at the bus port. This serial signal picked off one of the pins of the PC bus should be considered an equivalent to the separate serial input shown in FIG. 1.

Although the preferred form of the invention as shown in FIG. 1 includes separate network and bus type determination means 25 and external configuration input means 52, a device embodying the principles of the invention could include only the external input 50, port 48, and external configuration input means 52 through which configuration information is loaded into each of the reconfigurable devices, reconfigurable controller 12, reconfigurable transceiver 14, and reconfigurable bus interface 22. Such a device without the network and bus type determination means 25 would require that configuration information be chosen manually. Such manual configuration would use a configuration program running on the host computer and may include a questionnaire providing a list of check boxes listing all possible configuration setup parameters. The user would simply check the appropriate boxes or other user interface devices in order to send the desired configuration information to the interface device 10 through the host computer bus, or to send configuration information stored on-board in non-volatile memory 20 to the desired reconfigurable element 12, 14, or 22.

Another alternative includes the external configuration input means 52, serial port 48, and external input 50 and either a bus type determination arrangement or network type determining arrangement. In any event, any configuration information that cannot be determined on-board the device 10 or stored on-board the device 10 in non-volatile memory must be loaded manually onto the device through some external input.

Figure 2:
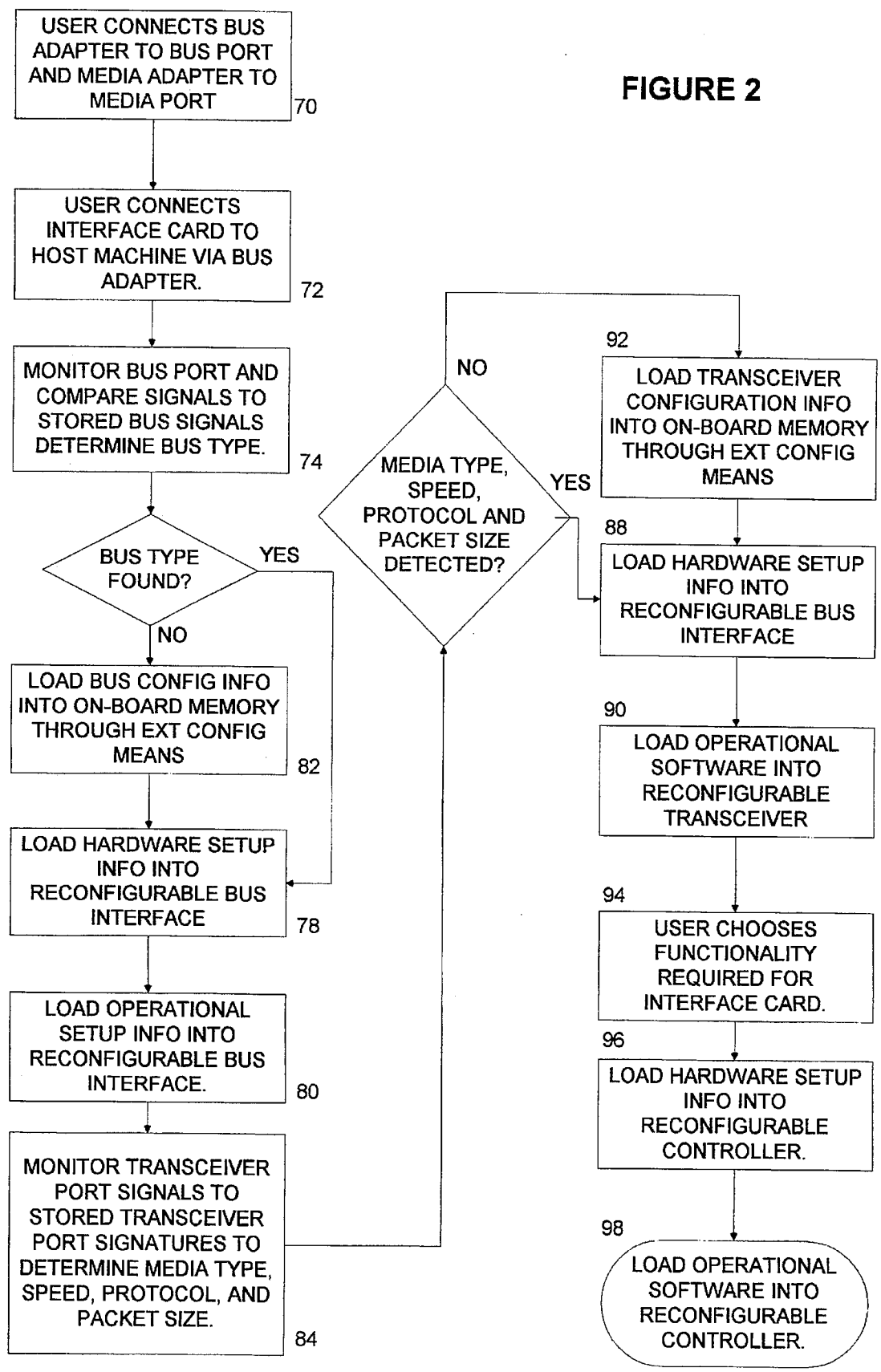
FIG. 2 is a block diagram showing the preferred process of configuring the network interface device according to the invention.

Referring now to FIGS. 1 and 2, the method of configuring the network interface device 10 includes first choosing and connecting to the network interface device an appropriate bus adapter 26 and media adapter 24a at step 70. The bus adapter 26 must fit the socket or other connector of the particular computer in which the card is to be installed and may include, for example, a ZIFF connector for the common PC expansion slots. In any case the bus adapter 26 includes the desire bus connector and conductors to transmit the bus signals to a bus port connector adapted to connect to the bus port 39.

The media adapter 24a, 24b must include a connector for the particular network media such as a coaxial cable connector, or twisted pair connector, for example. In the preferred form of the invention, the media adapter 24a, 24b may be implemented on a card similar to a PCMCIA card which includes the connector for the desired medium, a connector for connecting to the transceiver port, and signal conditioning circuitry required to transmit and receive signals across the particular medium. For example, when communications are through IR signals, the adapter card includes structure for generating and receiving IR signals. As another example, a BNC cable adapter would include a coaxial cable connector and circuitry for transmitting and receiving signals over coaxial cable.

Once the adapters are chosen and installed on the interface device 10, the user at step 72 installs the device in an available expansion or other socket 28 and connects the network medium 32a, 32b to the media connector associated with the media adapter 24a, 24b. At this point, the reconfigurable bus interface 22, reconfigurable controller 12, and reconfigurable transceiver 14 are not configured or are configured incorrectly if the device has been taken from a different type of machine operating in a different network type and connecting the computer through a different bus type. In order to receive power for operating the configuration control means 15, the bus adapter 26 is keyed to the particular bus type to pick off the power and ground connections from the particular computer bus. Alternatively, the device 10 may include a battery (not shown) for supplying power to the configuration control means 15 before the reconfigurable bus interface 22 is configured to receive power through the computer expansion slot or other computer bus connection.

At step 74 the configuration control means 15, and more specifically, the bus monitoring means 38, monitors or receives signals from the bus port 39 through the bus monitoring line 40. The configuration controller 46 compares the received signals to signature signals stored preferably in EPROM 20. If any of the stored signals match the monitored signals, the configuration controller 46 at step 78 directs hardware set up instructions for the matched bus type from the EPROM 20 to the reconfigurable bus interface 22 across the device bus 30. The configuration controller 46 uses the configuration address bus 34 to address the reconfigurable bus interface 22 so that only the reconfigurable bus interface receives the bus configuration hardware set up instructions. Once the reconfigurable bus interface 22 has received the appropriate hardware instructions, the configuration controller 46 at step 80 loads operational instructions or software into the now configured bus interface 22. In this preferred form of the Invention, the operational instructions are also preferably stored in the EPROM 20.

If the bus signals monitored by the bus monitoring means 38 do not match any of the signature or reference signals stored in memory on the device 10, bus interface configuration instructions must be loaded onto the device 10 from an external source as shown at step 82. The bus configuration instructions may be loaded into on-board memory or directly to the reconfigurable bus interface 22. The configuration instructions may be loaded through the serial port 48 or as serial signals through one of the conductors of the expansion slot or other host computer connector to which the device 10 was connected at step 72.

Once the reconfigurable bus interface 22 is set up, the reconfigurable transceiver 14 is set up or programmed either manually through an external input such as external input 50 or through software running on the host computer, or preferably through the network and bus type determination means 25. In the preferred form of the invention, the network monitoring means 42 at step 84 monitors or receives signals at each transceiver port 23a and 24b and compares those signals to reference signals stored preferably in the EPROM 20. A match in the signals indicates the network type, media type, media speed, media protocol, and packet size and allows the configuration controller 46 to load hardware set up and operational instructions to the reconfigurable transceiver 14 over the device bus at steps 88 and 90, respectively. Where multiple transceiver ports 23a and 23b are associated with the reconfigurable transceiver 14, the reconfiguration controller 46 loads hardware set up and operational instructions for each network type. Thus when multiple transceiver ports are associated with the reconfigurable transceiver 14, the reconfigurable transceiver may be configured to emulate more than one network hardware protocol, and the reconfigurable controller may be configured to emulate more than one software protocol.

If any time in the comparison process performed by the configuration controller 46 at step 84 the controller 46 cannot match a signature or reference signal stored in the EPROM 20, the hardware set up and operational instructions for the reconfigurable devices must be loaded from an external source. As with the unmatched bus interface configuration, such externally generated signals may be loaded through the serial port 48 and external configuration input means 52 or through the now configured bus interface 22. In either case the external configuration input means 52 directs the appropriate hardware set up instructions and operational instructions to the reconfigurable transceiver 14 at step 92.

With the reconfigurable bus interface 22 properly configured, the configuration controller 46 may access reference information through the host computer to which the device 10 is now connected rather than from a storage location on the device 10. That is, information on the transceiver 14 and controller 12 set up need not be retained on-board in memory such as EPROM 20, but may be stored in the host computer and accessible by the configuration controller 46.

At step 94 in FIG. 2, after the bus interface 22 and transceiver 14 are each configured for the proper bus architecture and network hardware protocol, respectively, the user must choose the functionality required for the interface device 10. This choice may be made through software running on the host computer. The reconfigurable network interface device 10 may be configured to operate as a network card, hub, bridge, router, brouter, gateway, or wide area network link, by loading the appropriate hardware set up and operational software instructions into the reconfigurable controller 12 at steps 96 and 98 in FIG. 2.

Figure 3:
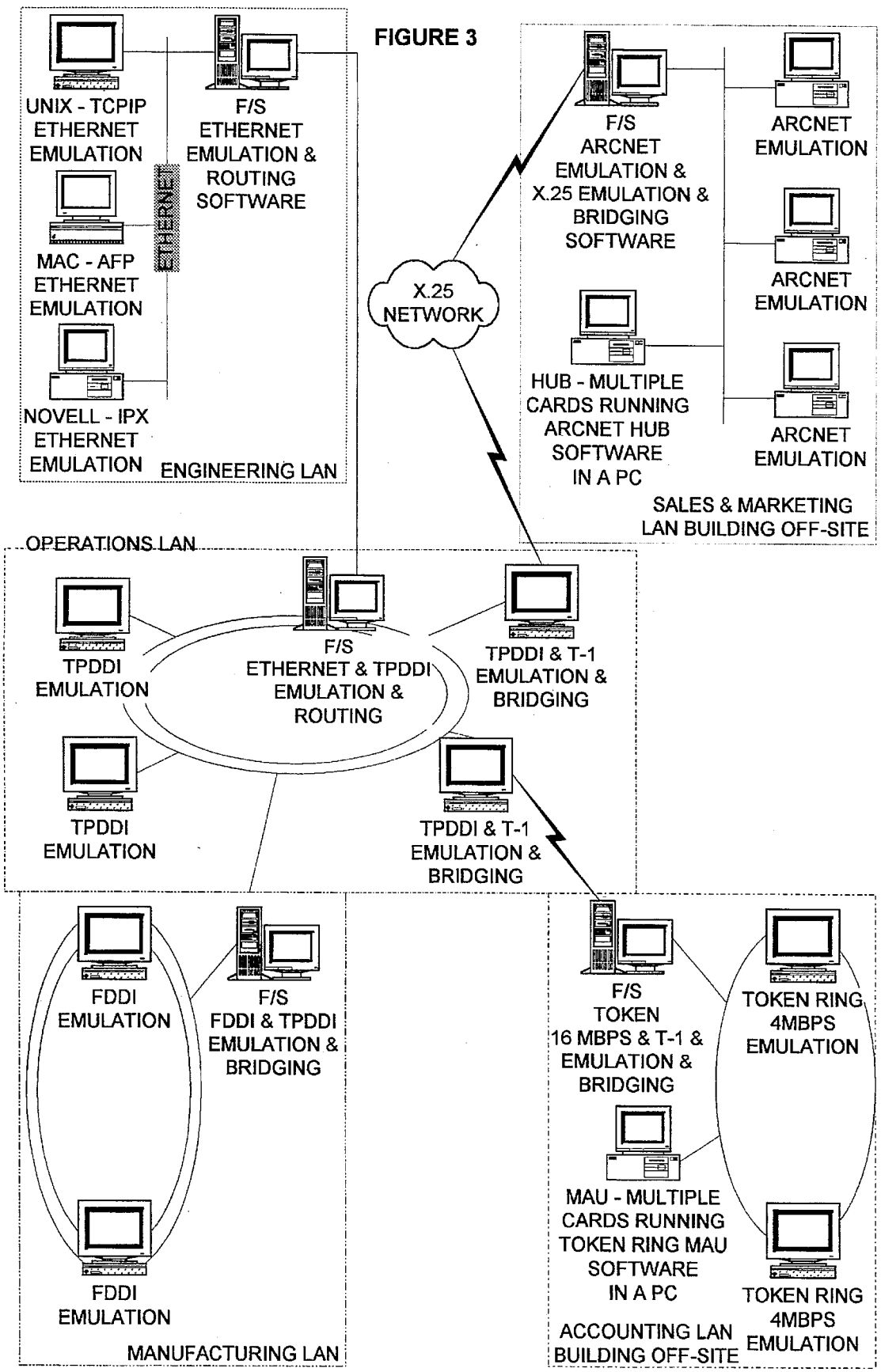
FIG. 3 is a diagrammatic representation of several possible applications of a reconfigurable interface apparatus embodying the principles of the present invention.

Referring now to FIG. 3, the device 10 according to the invention may be used in a hypothetical office comprised of engineering and operations at one location and sales and marketing, manufacturing, and accounting each at other locations. The engineering site has several work stations connected by means of Ethernet, utilizing three separate software protocols, TCP-IP, AFP, and IPX. These work stations are connected through a file server F/S to the operations local area network or LAN. Operations is using a TPDDI network connected over telephone lines by the X.25 protocol to the off-site sales and marketing LAN. Sales and marketing is using an ARCNet network with a hub. The operations LAN is connected by a TP-1 line to the off-site accounting LAN. Accounting is using a Token Ring network with a MAU. Finally, operations is connected to the manufacturing LAN which uses a Fiber Data Distributive Interactive or FDDI network. In each case, the LAN network interface and inter-network routing and bridging can be accomplished with the reconfigurable network interface device 10 according to the invention. This is in stark contrast to prior network interface devices which were each specific to a particular application. Also, with the multiple transceiver port version on the present invention illustrated in FIG. 1, a single card may be configured in the accounting LAN file server to handle Token Ring LAN communications and bridging to the operations LAN over the T-1 line.

Prior art coordination and interconnection of these systems was an expensive and complicated process. The reason for this was that each protocol had developed its own specific and segregated and separately functioning interfaces. For example, an Ethernet card can not be utilized in an ARCNet network. Neither can a ARCNet card be used in a Token Ring system, and so forth. As a result, in the prior art, when a company changed from one network to another, the previously purchased network was totally useless since it could not be reconfigured and would most likely be discarded. There was no way to utilize the network interfaces of the old system with the new system. Likewise, maintenance of the prior art systems was extremely expensive. The reason for this was that multiples of various specific types of cards had to be maintained to support each individual system. Further, even more varieties of cards were required in order to match similar networks with dissimilar hardware. That is, because the connectors on various hardware differed, it was required that even larger numbers of cards be kept on hand.

The reconfigurable network interface 10 of the present invention, however, enables the user to actually convert an ARCNet card, for example, to a Token Ring card. The invention enables a user to take the card utilized in an ARCNet network and change it to a Token Ring network card by simply pulling the ARCNet card out and reconfiguring the reconfigurable bus interface 22, reconfigurable controller 12, and reconfigurable transceiver 14. Once the physical and datalink layers of the OSI model are established by the means of the reconfigurable bus interface 22 and reconfigurable transceiver 14, the reconfigurable network interface 10 is capable of providing the remaining layers of the OSI model through software emulation with the reconfigurable controller 12. With this basic design, the reconfigurable network interface 10 has not only the capacity to provide different protocol support such as ARCNet, Ethernet, Token Ring, etc., but also has the ability to take on multi-level communications capabilities and thus perform the function of a hub, bridge, router, brouter, or gateway. Another important aspect of the reconfigurable interface 10 according to the invention is that as long as the reconfigurable elements have sufficient capacity, the devices may be configured in the future to provide an interface for future network types and future computer bus architectures and can not be made obsolete as different standards are created.

The above described preferred embodiments are intended to illustrate the principles of the invention, but not to limit the scope of the invention. Various other embodiments and modifications to these preferred embodiments may be made by those skilled in the art without departing form the scope of the following claims.

I claim:

1. A reconfigurable computer network interface apparatus comprising:

(a) a reconfigurable transceiver having a transceiver port associated therewith for operatively connecting with a transceiver connector of a media adapter, and further including a transceiver configuration input for receiving hardware and software transceiver configuration instructions, and a circuit array that is reconfigurable by the transceiver configuration instructions to communicate across the transceiver port in any one of a plurality of network hardware protocols;

(b) a media adapter having a media connector for operatively connecting to a desired computer network communications medium, and further having the transceiver connector for operatively connecting to the transceiver port, the transceiver connector being in communication with the media connector for enabling data to be passed back and forth between the transceiver port and the communications medium to which the media connector is connected;

(c) a reconfigurable bus interface having a bus port associated therewith, and further including a bus configuration input for receiving hardware and software bus configuration instructions, and a circuit array that is reconfigurable by the bus configuration instructions to communicate across the bus port in any one of a plurality of bus architecture protocols;

(d) a bus adapter having a bus port connector for operatively connecting with the bus port associated with the reconfigurable bus interface, and also having a bus socket connector for operatively connecting to a socket of a particular computer bus type, the bus port connector and the bus socket connector being in communication for passing data back and forth between a computer bus to which the bus socket connector is connected and the bus port associated with the reconfigurable bus interface;

(e) a device bus connected to the reconfigurable transceiver and the reconfigurable bus interface;

(f) a reconfigurable controller connected to the device bus, the reconfigurable controller including a controller configuration input for receiving hardware and software controller configuration instructions, and further including a circuit array that is reconfigurable by the controller configuration instructions to communicate with the reconfigurable transceiver across the device bus in any one of a plurality of different network software protocols and to communicate with the reconfigurable bus interface across the device bus;

(g) configuration control means connected to the reconfigurable transceiver, the reconfigurable controller, and reconfigurable bus interface for directing the transceiver configuration instructions to the transceiver configuration input, for directing the controller configuration instructions to the controller configuration input, and for directing the bus configuration instructions to the bus configuration input; and (h) memory means connected to the device bus for storing digital data.

2. The apparatus of claim 1 wherein the configuration control means includes:

(a) external configuration input means for receiving controller configuration instructions, transceiver configuration instructions and bus configuration instructions.

3. The apparatus of claim 2 wherein the configuration control means includes:

(a) bus type determination means connected to the bus port for identifying the type of computer bus to which the bus adapter is connected;

(b) wherein the memory means includes a non-volatile memory device for storing bus configuration instructions for a plurality of different bus architectures; and (c) a configuration controller connected to the device bus for directing bus configuration instructions from the non-volatile memory device to the bus configuration input in response to a bus type signal produced by the bus type determination means.

4. The apparatus of claim 1 wherein the configuration control means comprises:

(a) network type and bus type determination means connected to the transceiver port and to the bus port for identifying the type of network to which the media adapter is connected and for identifying the type of computer bus to which the bus adapter is connected;

(b) wherein the memory means includes a non-volatile memory device for storing bus configuration instructions for a plurality of different bus architectures, transceiver configuration instructions for a plurality of different network hardware protocols, and controller configuration instructions for a plurality of different network software protocols; and (c) a configuration controller connected to the device bus for directing transceiver configuration instructions from the non-volatile memory device to the transceiver configuration input in response to a network type signal produced by the network type and bus type determination means, and for directing bus configuration instructions from the non-volatile memory device to the bus configuration input in response to a bus type signal produced by the network type and bus type determination means.

5. The apparatus of claim 4 wherein the network type and bus type determination means includes:

(a) means for passively monitoring a network signal pattern received at the transceiver port;

(b) means for passively monitoring a bus signal pattern received at the bus port; and (c) wherein the configuration controller compares the network signal pattern with stored network signal patterns, each associated with a particular computer network type, and also compares the bus signal pattern with stored bus signal patterns, each associated with a particular bus type.

6. The apparatus of claim 5 wherein the configuration controller includes:

(a) external configuration input means for receiving controller configuration instructions and transceiver configuration instructions associated with computer network types which the network type and bus type determination means cannot identify, and for receiving bus configuration instructions associated with computer bus types which the network type and bus type determination means cannot identify.

7. The apparatus of claim 6 wherein the external configuration input means includes a serial data port.

8. The apparatus of claim 1 wherein the reconfigurable transceiver further includes:

(a) at least one other transceiver port associated therewith, each such other transceiver port for operatively connecting with a transceiver connector of a separate media adapter, and the circuit array included in the reconfigurable transceiver is reconfigurable by the transceiver configuration instructions received at the transceiver configuration input to communicate in any one of a plurality of network hardware protocols across each transceiver port.

9. The apparatus of claim 1 wherein the reconfigurable transceiver, reconfigurable controller, and reconfigurable bus interface each comprise a field programmable gate array.

10. A method of configuring an interface device between a computer and a computer network, the method comprising the steps of:

(a) connecting a bus port to a computer bus slot with a suitable bus adapter, and connecting a transceiver port to a network medium with a suitable media adapter;

(b) monitoring the signals received at the bus port;

(c) comparing a pattern of signals received at the bus port to bus signal patterns stored in memory to identify a bus type;

(d) loading bus configuration instructions from memory onto a reconfigurable bus interface circuit to enable the bus interface circuit to communicate with the computer across the bus port in a bus architecture protocol associated with an identified bus type;

(e) loading transceiver configuration instructions into a reconfigurable transceiver circuit to enable the reconfigurable transceiver circuit to communicate with the computer network across the transceiver port in a network hardware protocol associated with a network type; and (f) loading controller configuration instructions into a reconfigurable controller circuit to enable the controller circuit to communicate with the bus interface circuit and communicate with the reconfigurable transceiver in a network software protocol associated with the network type.

11. The method of claim 10 wherein the steps of loading transceiver configuration instructions into the reconfigurable transceiver circuit and loading controller configuration instructions into the reconfigurable controller circuit is performed through an external configuration input port for receiving configuration instructions originating at a location external to the interface device.

12. The method of claim 10 further comprising the steps of:

(a) monitoring the signals received at the transceiver port;

(b) comparing a pattern of signals received at the transceiver port with network signal patterns stored in memory to identify a network type; and (c) wherein loading transceiver configuration instructions into the reconfigurable transceiver circuit comprises loading transceiver configuration instructions associated with the identified network type.

13. The method of claim 10 wherein:

(a) the reconfigurable bus interface circuit, the reconfigurable controller circuit, and the reconfigurable transceiver circuit each comprise a field programmable gate array; and (b) the steps of loading bus configuration instructions, loading controller configuration instructions, and loading transceiver configuration instructions into the respective reconfigurable circuit comprises applying the respective configuration instructions to a configuration input associated with the respective reconfigurable circuit.

14. The method of claim 12 including the steps of:

(a) loading controller configuration instructions and transceiver configuration instructions from an external source when the signal pattern monitored at the transceiver port does not match any of the network signal patterns in memory; and (b) loading bus configuration instructions from the external source when the signal pattern monitored at the bus port does not match any of the bus signal patterns in memory.

15. A method of configuring an interface device between a computer and a computer network, the method comprising the steps of:

(a) connecting a bus port to a computer bus slot with a suitable bus adapter, and connecting a transceiver port to a network medium with a suitable media adapter;

(b) loading bus configuration instructions from memory external to the interface device into a reconfigurable bus interface circuit to enable the bus interface circuit to communicate with the computer across the bus port in a bus architecture protocol associated with a computer bus type;

(c) loading transceiver configuration instructions from memory external to the interface device into a reconfigurable transceiver circuit to enable the reconfigurable transceiver circuit to communicate with the computer network across the transceiver port in a network hardware protocol associated with a network type; and (d) loading controller configuration instructions from memory external to the interface device into a reconfigurable controller circuit to enable the controller circuit to communicate with the bus interface circuit and communicate with the reconfigurable transceiver in a network software protocol associated with the network type.

16. The method of claim 15 wherein the steps of loading bus configuration instructions, loading transceiver configuration instructions, and loading controller configuration instructions are each performed through the bus adapter and bus port.

* * * * *